United States Patent Office 3,182,006
Patented May 4, 1965

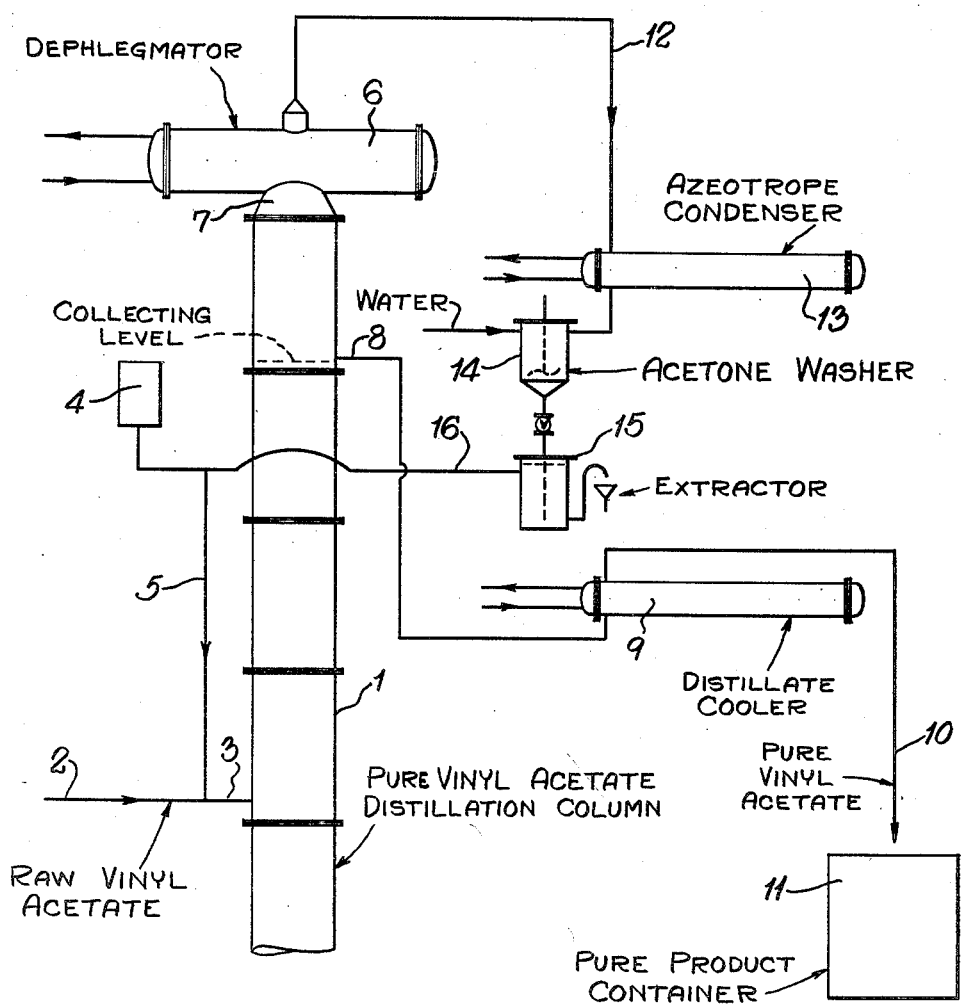

3,182,006
PROCESS FOR SEPARATING ACETONE AND OTHER CARBONYL COMPOUNDS WITH 3 CARBON ATOMS FROM VINYL ACETATE
Otto Fruhwirth, Burghausen, Upper Bavaria, Germany, assignor to Wacker-Chemie G.m.b.H., Munich, Germany, a corporation of Germany
Filed Dec. 7, 1961, Ser. No. 157,823
Claims priority, application Germany, Feb. 21, 1961, W 29,513
3 Claims. (Cl. 202—42)

This invention relates to the purification of vinyl acetate such as that produced from acetylene and acetic acid according to the usual vapor-phase contact process, and it has for its object to simplify and expedite the removal of acetone and other carbonyl compounds with 3 carbon atoms from the vinyl acetate.

Another object of the invention is to separate acetone and other carbonyl compounds with 3 carbon atoms from vinyl acetate by a novel process of azeotropic distillation.

Various other objects and advantages will be apparent as the nature of the invention is more fully disclosed.

During the production of vinyl acetate according to the vapor-phase contact process from acetylene and acetic acid, carbonyl compounds with 3 carbon atoms are formed, depending particularly on the contact temperature, primarily acetone, whose complete separation from the pure product meets with difficulties when using the usual distilling equipment. Hence the tendency prevails to adhere to reaction conditions where only as small a quantity of acetone is formed in the raw product as can be separated by the customary preliminary distilling column, and where a content of 0.025% carbonyl compounds in the end product is not exceeded.

Hoewver, it is not possible to deviate procedurally if the acetylene used contains impurities which under the reaction conditions form acetone or similar carbonyl compounds. Such impurities are mainly methyl acetylene and propadiene which occur in quantities of 0.5–1% in the acetylene, particularly when the latter is obtained by incomplete combustion of methane. In order not to exceed the carbonyl content of 0.025% indicated above, a separate column is necessary in this case to separate the acetone.

I have now discovered a process for separating acetone and other carbonyl compounds with 3 carbon atoms from vinyl acetate by means of azeotropic distillation. The process is characterized by the fact that additives are used whose azeotropic boiling point with acetone lies about 5–50° C. below the boiling point of pure vinyl acetate and whose critical pressure differs from that of acetone by at least 3 atmospheres, and the additive is recirculated into the distilling column after removal of the acetone from the azeotropic mixture.

Suitable additives are liquid at room temperature and include saturated and unsaturated aliphatic or cycloaliphatic hydrocarbons, as for instance 1-pentene, pentane, isoprene, 2-methyl-1-butene, n-hexane, n-heptane, cyclopentadiene, cyclopentane and cyclohexane. However, one can also use chlorinated hydrocarbons, such as for instance chloroform, carbon tetrachloride, 1,1-dichlorethane, 1-chlorpropane, 2-chlorbutane, or sulphurous compounds, for instance carbon disulphide.

Listed below by way of example is a selection of such additives, with their properties including the boiling point, acetone content, boiling point of the binary mixture, and critical pressure:

| Additive | Boil. Pt., °C. | Percent acetone | Boil. pt. of binary mixt., °C. | At. critical pressure |
|---|---|---|---|---|
| n-Pentane | 36 | 19 | 29 | 33 |
| n-Heptane | 98.4 | 89.5 | 55.9 | 26.8 |
| Cyclopentane | 49 | 36 | 41 | 36 |
| Cyclohexane | 80.8 | 67 | 53 | 40.6 |
| Cyclohexadiene | 80.4 | 85 | 55 | 32 |
| Chloroform | 61.2 | 21.5 | 64.4 | 54.9 |
| 1,1-dichlorethane | 57.3 | 70 | 57.5 | 50 |
| Carbon disulphide | 46.2 | 33 | 39.3 | 72.9 |

For a complete separation of acetone or other carbonyl compounds with 3 carbon atoms such a quantity of additives should be used that, depending on the acetone percentage in the azeotropic mixture, complete removal by distillation at the azeotropic boiling point is possible. For instance, in order to remove 0.8% acetone in vinyl acetate, using n-heptane as the binary component, the addition of 0.08% heptane is necessary in order to separate the contained acetone completely. An excess of additives can be used, which does not introduce any disadvantages, because after the acetone is washed out with water, the full quantity of additives is returned into the process. Since the compounds indicated form mixtures with vinyl acetate having minimum boiling points, they will be returned completely into the circuit at the head of the column, even if their boiling point, like for instance that of cyclohexane with 80.8° C. is higher than that of pure vinyl acetate (72.7° C.).

Using the indicated additives it is possible to carry out the pure distillation of vinyl acetate and the separation of undesired carbonyl compounds in a distilling column. The pure vinyl acetate is removed several floors, about 2–10, below the head of the column, preferably in liquid form, while the azeotropic mixture of additive and acetone is carried over a dephlegmator at the head, condensed, washed with water and, after separation of the remaining water, is returned again to the column.

Since the additive does not get lost during the distilling process, but is returned to the column again and again after the acetone is washed out and preferably is admixed with the raw material which is being continuously fed into the column, in general only one single addition is required; and thereafter care must be taken about supplementing it only to such an extent that the small losses are replaced.

The invention is described in the following examples in connection with the accompanying drawing which is a diagrammatic illustration of a distillation system suitable for carrying out the process of the invention.

*Example 1*

Raw vinyl acetate from the vapor phase contact process, which after the customary separation of the first running still contains 0.8% of acetone and all materials with a higher boiling point, is continuously fed at the rate of 300 kg./h. through pipe 2 into the middle portion 3 of the pure vinyl acetate distilling column 1. When the distillation begins, a quantity of 5 kg. cyclohexane is fed from container 4 through pipelines 5 and 2 into column 1. From the dephlegmator 6 at the head 7 of column 1 a return flow of 400 kg./h. consisting of vinyl acetate and higher boiling portions is condensed in column 1. 200 kg./h. of pure vinyl acetate are collected by pipe 8 from a collecting bell bottom which is situated four levels below the head 7 of column 1, and it is fed through the distillate cooler 9 and thence through pipeline 10 into the pure product container 11. The result of adding cyclohexane to the column input is that the acetone which was enriched in the top three column levels no longer escapes with pure vinyl acetate on the fourth level underneath, but is transferred through the dephlegmator 6 through pipeline 12 as an azeotropic mixture of cyclohexane-vinyl acetate and excess vinyl acetate. This mixture, after condensation in condenser 13, is mixed with water in the washer 14 to remove the acetone, and then through the extractor 15 whence it is admixed again to the column input through pipelines 16 and 5. This makes it possible to remove pure vinyl acetate, free of acetone, from the pure vinyl acetate column 1.

*Example 2*

Vinyl acetate from the vapor phase contact process, which after the customary separation of the first runnings still contains 0.8% acetone besides 0.2% acrolein and 0.1% propionic aldehyde, is fed into distilling column 1 through pipe 2 in admixture with the washed azeotrope circulation which has a content of 0.33% cyclohexane and is carried through pipelines 16 and 5. On the fifth level underneath the head 7 of column 1 pure vinyl acetate, free of acetone and other carbonyl compounds, is withdrawn in liquid form through a pipe such as 8 and fed to the vinyl acetate container through the distillate cooler 9 and pipeline 10. The azeotropic mixture cyclohexane-acetone and excess vinyl acetate overflowing at the head 7 of column 1 through the dephlegmator 6 is fed into the azeotrope condenser 13 through pipeline 12 and after washing with water in washer 14, and separation from adhering water in extractor 15, it is admitted to column input 3 through pipelines 16 and 5.

*Example 3*

Vinyl acetate freed from its first runnings, with a content of 0.5% acetone, 0.05% acrolein and 0.02% propionic aldehyde, by admixture of the azeotrope circuit freed of acetone and containing 0.06% heptane, is fed through pipelines 16 and 5 into pure distilling column 1, consisting of sixty bell bottoms, at the 20th bottom (from below). By admixing the azeotrope circuit containing heptane one obtains a content of 0.06% heptane, in proportion to the total input quantity into column 1.

On the 50th bottom from below (i.e., the 10th bottom from above) which is shaped as a receiver or catch bottom, pure vinyl acetate in liquid form, containing only 0.01% acetone, is carried off by a pipe such as 8 and then, through the distillate cooler 9 and pipeline 10, it is fed into the pure product container 11. The azeotropic mixtures of 89.5% acetone and 10.5% heptane, as well as 83.5% vinyl acetate, 16.5% heptane and excess vinyl acetate being distilled through the dephlegmator 6 are condensed in the azeotrope condenser 13, washed discontinuously in the acetone washer 14 equipped with a stirrer and a conical bottom—with the triple volume quantity of water, left to settle in container 15 and then carried to a suitable collector container from which an even flow into the input of column 1 takes place.

*Example 4*

The process is the same as in Example 2, but the column input is mixed, instead of cyclohexane, with chloroform up to a content of 1%. The pure vinyl acetate obtained is practically free of acetone.

*Example 5*

The process is the same as in Example 2, but the input to the column is regulated, instead of with cyclohexane, by the addition of carbon disulphide—to a content of 0.7%. The azeotropic mixture of carbon disulphide and acetone carried over the dephlegmator at the head of the column and the excess vinyl acetate are admitted again to the column input after condensation, washing with water and separation.

The invention claimed is:

1. Process for continuously separating small quantities of acetone and other carbonyl compounds having 3 carbon atoms from vinyl acetate by azeotropic distillation, which comprises azeotropically distilling said vinyl acetate in a distillation column with an additive whose azeotropic boiling point with acetone is about 5–50° C. below the boiling point of pure vinyl acetate and whose critical pressure differs from that of acetone by at least 3 atmospheres, said additive being selected from the group consisting of saturated and unsaturated aliphatic and cycloaliphatic hydrocarbons, chlorinated hydrocarbons and carbon disulphide, drawing off pure vinyl acetate as a liquid sidestream from the upper part of said column, distilling off the carbonyl compounds with the azeotropic mixture of acetone and additive, and removing the carbonyl compounds from the distilled azeotropic mixture by washing the latter with water.

2. Process according to claim 1, in which the azeotropic distillation takes place in a distillation column and in which the additive, after removal of the carbonyl compounds from the azeotropic mixture, is readmitted to said distillation column.

3. Process according to claim 1, characterized by the fact that said additive is liquid at room temperature.

References Cited by the Examiner
UNITED STATES PATENTS

| | | | |
|---|---|---|---|
| 2,431,554 | 11/47 | Hansley et al. | 260—499 |
| 2,704,271 | 3/55 | Harrison et al. | |
| 2,997,495 | 8/61 | Rutledge et al. | 260—499 X |

NORMAN YUDKOFF, *Primary Examiner.*

MILTON STERMAN, ALPHONSO D. SULLIVAN, GEORGE D. MITCHELL, *Examiners.*